Figure 1:
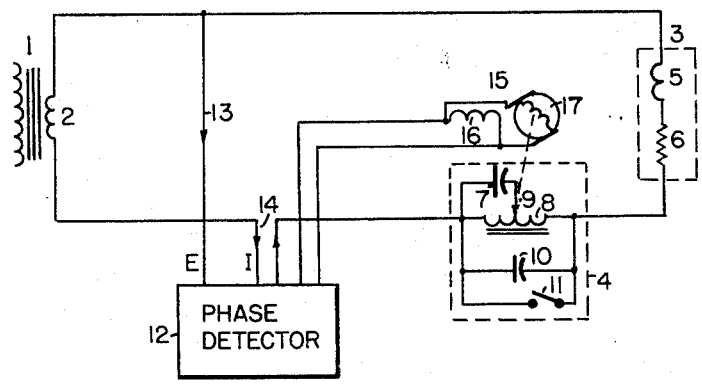

Nov. 21, 1961 J. A. ROSS 3,010,064
AUTOMATIC POWER FACTOR CORRECTOR
Filed Oct. 6, 1958 2 Sheets-Sheet 1

INVENTOR.
JAMES A. ROSS
BY *Harry R. Lubcke*
AGENT

INVENTOR.
JAMES A. ROSS
BY Harry R. Lubcke
AGENT

United States Patent Office 3,010,064
Patented Nov. 21, 1961

3,010,064
AUTOMATIC POWER FACTOR CORRECTOR
James A. Ross, San Fernando, Calif., assignor to Ling-Temco-Vought, Inc., Dallas, Tex., a corporation of Delaware
Filed Oct. 6, 1958, Ser. No. 765,576
13 Claims. (Cl. 323—102)

My invention relates to matching electrical characteristics over a large range of frequencies and particularly to maintaining the power factor of an electromagnetic vibrator or the like at a value near unity by automatic means.

In the art of vibration testing it is usual to embrace a frequency range from a few cycles to a few thousand cycles. The usual "shaker," or electrical to mechanical transducer, has an inductive leakage reactance because of less than complete coupling between the so-called voice coil and the adjacent shorted turn shading ring. Consequently, it has heretofore been impossible to carry out a continuous frequency sweep with such a device at a nominal input power. Manual switching of power factor correcting capacitors has been required if there was to be any improvement in this direction. Such manual operations are extremely inconvenient and for this reason it has been general practice to employ a 7 kilowatt amplifier to accomplish a vibratory force of 1,200 pounds; i.e., to actuate a 1,200# shaker.

With my automatic power factor corrector the same force can be produced with a 3 kilowatt amplifier.

The electrical equivalent of the voice coil of a shaker is a resistor in series with an inductor. The impedance is low, a few ohms, and so the current required for kilowatts of power is measured in deca-amperes.

My device takes the form of one capacitor of small capacitance shunted across an autotransformer, with a large capacitance capacitor connected to between a variable tap and one end terminal of the autotransformer. This allows the capacitative reactance of a fixed capacitor to be increased or decreased by varying the ratio of a "pure" autotransformer. In other words, a continuously variable equivalent capacitor is obtained by connecting a fixed capacitor to a "perfect transformer" having a variable turns ratio.

From first principles it is known that a perfect transformer merely reflects the loads connected to it, contributing neither reactance nor resistance of itself. Although perfect transformers are never realized in practice I obtain the results sought with practical elements. It is important to note that it is the transformer effect which I employ and not some combination of inductance with capacitance.

When maximum capacitance is required the variable tap of the autotransformer is moved by a servo motor to give a one to one ratio, thus the lowest value of capacitance reactance. Conversely, the effect of minimum capacitance is obtained by transforming up the capacitative reactance of the fixed capacitor by connecting it across only a few turns of the autotransformer while the whole of the autotransformer is in the circuit requiring modification of power factor.

The position of the variable turns ratio tap is automatically chosen in my device by sensing both the voltage and the current of the shaker voice coil circuit. This information is fed into a phase detector, which exercises corrective phase functions. These functions are carried out by a thyratron and relay controlled two-phase electric motor which mechanically alters the position of the autotransformer tap. Diode protective means are provided so that practical components are not destructively overloaded, as are other control means having to do with the frequency of operation of the system.

An object of my invention is to automatically correct the phase angle of a circuit which is subject to influences which change the phase angle thereof.

Another object is to automatically obtain a range of values of capacitative reactance from a fixed capacitor.

Another object is to automatically adjust a reactive element in a circuit to give a phase angle relatively independent of frequency.

Another object is to provide a device which allows a wide variation of frequency while still obtaining high efficiency of power transfer to a useful load.

Another object is to provide an electronic control for adjusting reactive electrical circuit elements.

Other objects will become apparent upon reading the following detailed specification and upon examining the accompanying drawings, in which are set forth by way of illustration and example certain embodiments of my invention.

Figure 2:
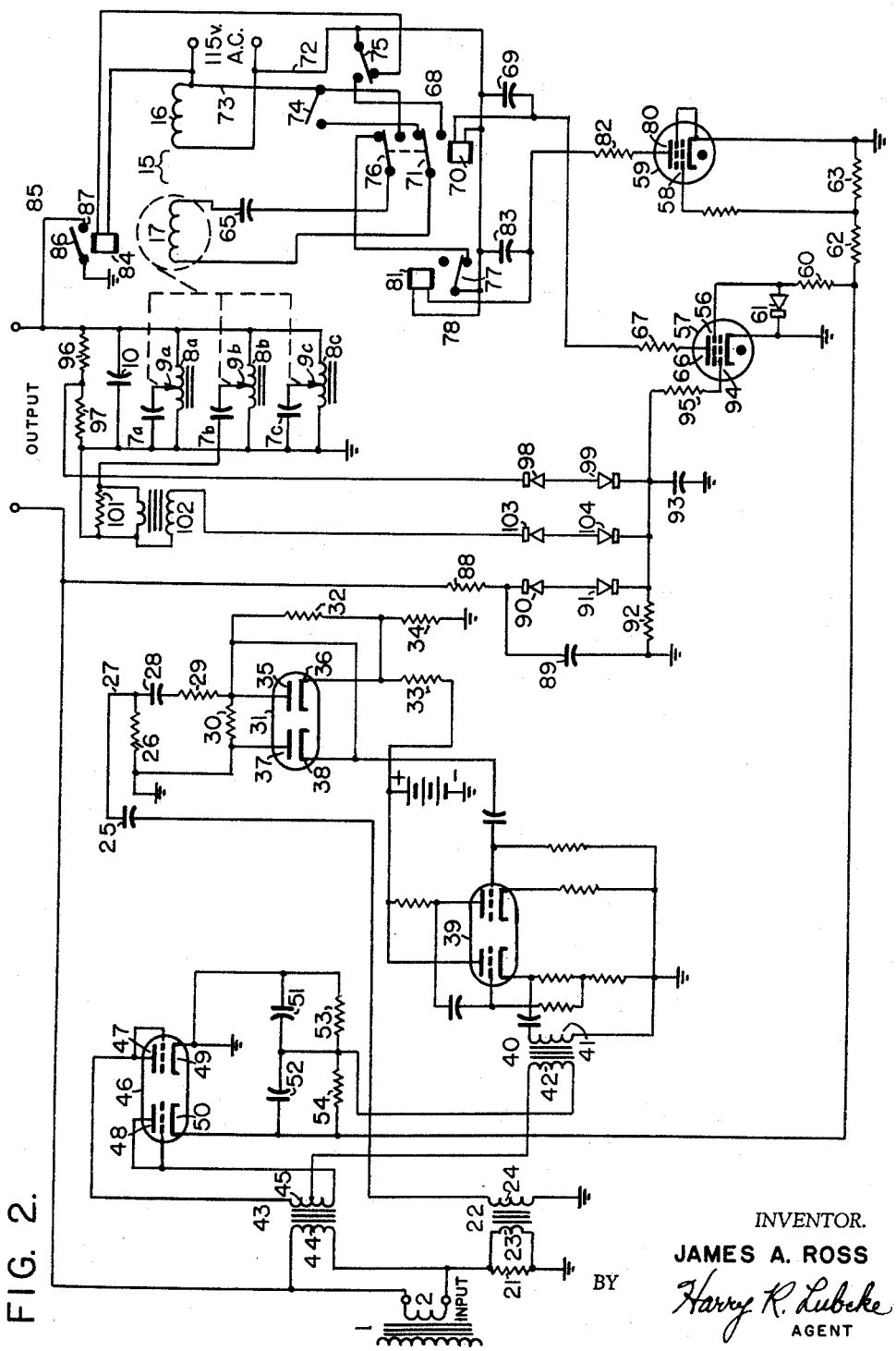

FIG. 1 shows a simplified diagram of my device, and
FIG. 2 shows a complete schematic diagram of my device.

In FIG. 1 numeral 1 indicates an output transformer, which functions to reduce the impedance of a suitable driving source for the shaker. This may be the well known electronic power amplifier having a power capability in the kilowatt range and a frequency capability in the audio and the sub-audio frequency ranges.

The secondary 2 of transformer 1 is connected in series with the voice coil or signal input circuit 3 of the shaker and with the in-circuit elements 4 of my power factor corrector device. The equivalent circuit of the voice coil is represented by inductor 5 and resistor 6. These latter elements have small absolute values, but above what might be termed the center of the audio spectrum (approximately 400 cycles) the variation of impedance with frequency is considerable, and increasingly so as the frequency increases.

Capacitor 7 is the one having a variable capacitative reactance brought about by connection thereof between one end of autotransformer 8 and variable tap contact 9. Capacitor 10 has a capacitance of the order of three microfarads. It is connected across the whole autotransformer 8, permanently, and resonates the voice coil 3 at a high audio frequency, such as 3,000 cycles. Capacitor 7 hay have a capacitance of 120 microfarads and tune the voice coil at 350 cycles. Switch 11 is closed when the maximum equivalent capacitance value of capacitor 7 is reached and makes the capacitance value infinite, in a manner of speaking. The shorting out of the power factor corrector components occurs at low frequencies, where phase angle correction is not required, and for starting the system.

Phase detector 12 is supplied with electrical information as to the voltage existing across the load by conductor 13. Conductor 14 enters the phase detector to give electrical information as to the current passing through the load. These two aspects of information are compared and an appropriate correction signal developed and fed to servo motor 15, including both field 16 and armature 17. The armature is mechanically coupled to the variable tap 9, as indicated by the dashed line, to vary the autotransformer ratio.

The details of the phase detector and of other auxiliary circuits are given in FIG. 2, which shows the full schematic diagram of a typical embodiment of my invention and which will now be described.

Besides the power connections from power amplifier transformer secondary 2 as initially shown in FIG. 1, connections for actuation of the phase detector from that secondary are also made as shown in FIG. 2. From what is the low potential side of that transformer secondary a connection is made to resistor 21. This resistor has a very low resistance, such as a hundredth of an ohm. The other side of resistor 21 is connected to ground. Accordingly, the full current through the voice coil of the shaker flows through resistor 21 and the connection identified as 14 in FIG. 1 is accomplished.

A step up ratio transformer 22 has a primary 23 connected across resistor 21 and a secondary 24 across which appears a voltage many times greater than the IR drop in the resistor. The latter may be a few tenths of a volt and the secondary voltage of the order of thirty volts. One side of the secondary is connected to ground and the other side to essentially a resistor-capacitor differentiating combination 25, 26. The capacitor has a capacitance of the order of a thousandth microfarad and the resistor a resistance of a few thousand ohms. At the junction between the two a 90° phase shift of the voltage representing the current through resistor 21 occurs. The amplitude of the voltage rises 6 db per octave increase in frequency.

Capacitor 28 is merely a coupling capacitor having a capacitance at least ten times that of capacitor 25. Resistors 29 and 30 form a voltage divider, which gives some reduction of the voltage applied to double clipper 31 and provides nominal isolation from the previous differentiating circuit. Resistor 32 has a value of the order of a half megohm, resistor 33 of the order of one-tenth that and resistor 34 a value of the order of a thousand ohms. Plate 35 of double diode 31 is connected to the junction of resistors 29 and 32, coacting cathode 36 to the junction between resistors 32 and 33, second plate 37 to ground, and second cathode to plate 35. The voltage at either of these last two mentioned electrodes is the same, of course, and is limited in both positive and negative polarities to the same value. This value may be 5 volts above and five volts below the zero voltage axis. These are peak values.

This output is conveyed to double triode 39, which is an amplifier with a gain of ten times and a cathode follower output stage. The resistive and capacitative values associated with this amplifier are not critical. The time constant of the input circuit thereof is of the order of a hundredth of a second. The input and the output of the cathode follower stage is of the order of 100 volts peak to peak and is of the same limited waveform as derived from clipper 31.

Transformer 40 preferably has a two to one step-down ratio. Primary 41 is connected to the cathode output of the cathode follower and secondary 42 is connected to a phase detector to be described later.

A voltage proportional to the voltage across the shaker load, as indicated by conductor 13 in FIG. 1 is obtained in FIG. 2 by means of transformer 43. The primary 44 thereof is connected across secondary 2. Transformer 43 has a slight step-down ratio. Secondary 45 supplies a signal amplitude of the order of 65 volts in a typical embodiment. One terminal of the previously mentioned secondary 42 connects to a center tap on secondary 45. The extremities of secondary 45 are connected to double triode vacuum tube 46, which is connected as a double diode by having each grid and corresponding plate connected together. The usual form of vacuum diode may also be employed here, but the circuit as constituted is relatively high impedance and thus not suited for semiconductor diodes. The composite anodes of tube 46 are given numerals 47, 48 for identification. Corresponding cathodes 49, 50 are symmetrically connected to two capacitors 51, 52. These are of the same capacitance, a fraction of a microfarad each. The cathodes are similarly connected to two resistors 53, 54, having equal resistances each of a quarter megohm. The other terminal of transformer secondary 42 is connected to both the junctions between the capacitors 51, 52 and resistors 53, 54.

These capacitors and resistors comprise the bridge of the phase detector. The current sensing input from transformer secondary 42 is of constant amplitude because of previously having been limited in double diode 31.

It will be noted that cathode 49 is connected to ground. The opposite cathode 50 represents the output from the phase detector. When the phase of the voltage representing current through the voice coil of the shaker (from secondary 42) is 90° out of phase with respect to the voltage representing the voltage across the load circuit (from secondary 45) then equal outputs are obtained from each cathode. Thus the potential of cathode 50 is zero. This represents the condition when the shaker voice coil load is purely resistive. As soon as the impedance of the load becomes inductive a negative voltage appears at cathode 50.

The phase detector output is conveyed to screen grid 56 of thyratron 57 and to control grid 58 of thyratron 59 for the joint control of servo motor 15. Both thyratrons are of the same capacity, as the 2050 type, having 100 milliamperes maximum current rating, but thyratron 57 is connected to be more responsive to the output of the phase detector than thyratron 59. The full phase detector output is impressed upon grid 56 of thyratron 57, save for the presence of the current limiting resistor 60, which has a resistance of the order of a hundred thousand ohms, and Zener diode 61, which has an avalanche voltage of eight volts.

Resistor 62 has a resistance of the order of a half megohm and resistor 63 a resistance of the order of a quarter megohm. Thus, only one-third of the phase detector output is conveyed to the grid 58 of thyratron 59. The reason for having two thyratrons of different effective sensitivity is to give the servo control loop a "dead space," that is, a narrow range of conditions over which servo adjustment will not occur. This reduces the wear on the brushes constituting the variable tap 9 in FIG. 1.

Motor 15 is represented in FIG. 2 by field coil 16 and armature coil 17. A low powered two phase motor is preferred. Capacitor 65, having a capacitance of a few microfarads, provides a 90° phase displacement for the armature with respect to the field and accomplishes the two phase actuation of the motor.

The plate (or anode) 66 of thyratron 57 connects through a current limiting resistor 67, of the order of a thousand ohms, to relay 68, this is a double pole double throw relay. Capacitor 69 is connected across relay coil 70 as a practical matter to prevent relay chatter and has a capacitance of a few microfarads.

The position of the contacts of relay 68 shown are for thyratron 57 not conducting. That is, the phase detector has supplied a negative output because of inductive reactance in the impedance of the voice coil circuit. The field 16 is constantly connected to an energizing 115 volt 60 cycle power line (as long as the system as a whole is "on"). The armature, however, is either connected in one instantaneous polarity or the opposite polarity, or is disconnected, in order to control the motor. As shown, the armature is connected through arm 71 of relay 68 being in the upper position to side 73 of the 115 volt 60 cycle line 72, 73. Switch 74 is a limit switch, as is switch 75. These are shown for the power factor corrector shorted out position. That is, switch 11 closed in FIG. 1. For the usual condition of the power factor corrector in the circuit, switch 74 is closed and switch 75 is on the upper contact. These switches are mounted so as to be mechanically operated by the motion of tap 9 along the autotransformer, at each extreme. The circuit to supply line 72 is completed through capacitor 65, arm 76 of relay 68 being in the upper position and through arm 77 of a second relay 78 being in the lower position.

When thyratron 57 conducts, arms 71 and 76 are in the lower position. This causes arm 71 to connect to supply line 72, thus connecting armature 17 thereto and the return path therefrom is through capacitor 65 and arm 76 to supply line 73. This is the opposite connection to that previously described and so the motor 15 revolves in the opposite direction.

In a similar manner thyratron 59 is connected through plate 80 to the actuating coil 81 of relay 78. Current limiting resistor 82 and capacitor 83 are included in this circuit in the same manner and for the same reasons as described in connection with thyratron 57.

The routine of operation of the thyratrons and the motor is as follows.

When thyratron 57 is conducting, regardless of whether thyratron 59 is conducting, the motor 15 will be caused to rotate to give maximum capacitance value to the circuit; i.e., to the right hand extremity of winding 8 for brush 9 in FIG. 1. Unless another command based upon the phase of the system intervenes, the motor will go to the extreme in this direction. This will actuate limit switch 75 to the lower contact, energize relay coil 84 of relay 85 and contacting contact 87, arm 86 taking the lower position. This shorts out the phase corrector from the voice coil circuit.

When a negative voltage is fed from the phase detector, thyratron 57 is the first to be rendered non-conducting. Thyratron 59 then still being conducting, the motor is stopped; i.e., arm 77 lifts, breaking the armature circuit. This action provides the dead space mentioned and also eliminates "hunting."

When the negative voltage from the phase detector becomes still more negative than above, then thyratron 59 is also rendered non-conducting. This gives the relay contact configuration shown and the motor 15 goes to the opposite extreme of the autotransformer; i.e., to the left in FIG. 1. This causes the capacitance to appear to become smaller; the capacitative reactance to increase. This action continues until limit switch 74 is actuated, and it is opened, as illustrated. No other action takes place, such as does take place at the opposite extreme.

In practice it is found that one autotransformer of sufficient size to carry the deca-amperes is not readily available as an article of commerce. Thus, I gang several such devices in parallel. One of these components that I have used is the high frequency model (400 cycles, etc.) of the "Variac." Such units have a maximum brush current carrying capability of ten amperes each. Accordingly, a number of these are paralleled, three as an illustrative example being shown in FIG. 2. It is to be understood, of course, that a large single unit could be fabricated and used alone, or that the number paralleled could be increased almost without limit.

In FIG. 2 the components 8a, 8b, 8c comprise autotransformer 8 in FIG. 1, and similarly for capacitors 7a, 7b, 7c, each one of which has a capacitance one-third that of basic element 7. The autotransformers are normally arranged upon a circular core with a toroidal winding. The motion of ganged contacts 9a, 9b, 9c are thus circumferential. This is accomplished by connection of the same to the shaft of motor 15 in known mechanical fashion, which may include a speed reducing gear box.

In addition to the basic phase-correction functioning detailed above, I have found it necessary and desirable to provide certain protective elements in the control portion of my device. These combinations act in approximately the same manner as phase information and affect the control electrodes of the thyratrons in order to produce appropriate servo motor responses.

I have also provided additional shorting-out means that depend upon frequency for actuation. I have found that in the usual vibratory system the effect of inductive reactance is not appreciable at frequencies lower than some frequency lying between 350 and 400 cycles.

Resistor 88 and capacitor 89 are in series to ground across the voice coil circuit and comprise a frequency responsive integrator. Resistor 88 has a resistance of the order of ten thousand ohms and capacitor 89 a capacitance of a half microfarad. A connection is taken from the junction between these two elements and connected to Zener diode 90. This may be the 653C9 type. It is in series with an ordinary rectifying diode, such as a 1N93 and a resistor 92 also connected to ground and having a resistance of approximately a hundred thousand ohms.

As the operating frequency is decreased, as by the operator in performing a frequency sweep, and a frequency of the order of 350 cycles is reached the signal voltage rises at the junction mentioned to a fairly large value, such as twenty volts. This is because the voltage taken is across capacitor 89; the reactance across any capacitor being infinite at zero frequency. As soon as the breakdown voltage of the Zener diode is exceeded, current of the ssignal is passed. This is rectified by diode 91, which diode is poled to give an output of negative polarity. A negative potential is thus established at the ungrounded end of resistor 92. This is filtered to approximately a direct current by capacitor 93, which has a capacitance of a few microfarads. This voltage is impressed upon control grid 94 of thyratron 57 through current limiting resistor 95 of a half megohm resistance.

It is evident that for frequencies greater than approximately 350 cycles the voltage across capacitor 89 will not be sufficient to break down Zener diode 90. Consequently, this circuit will be completely ineffective in influencing the operation of my power factor corrector. Below that frequency, however, thyratron 57 will be cut off, and when this happens the servo motor will be actuated to go to the extreme position which shorts out the power factor corrector at relay 85.

As would be expected, there is a voltage limit on the autotransformers 8a, 8b, 8c, etc., which happens to be 120 volts for a practical embodiment. In order that this may not be exceeded in my device, where frequency and other electrical parameters vary greatly under various conditions of normal operation as compared to operation of autotransformers on ordinary power circuits, a voltage divider is formed across the parallel connected autotransformers. This consists of resistors 96 and 97. Resistor 97 has about one-fifteenth the value of resistor 96, thus approximately ten volts (R.M.S.) appears across it when the voltage rating of the autotransformers is being exceeded. This voltage is impressed across Zener diode 98 and ordinary diode 99 in the same manner as has been previously explained. Zener diode 98 has a breakdown voltage of plus 8 volts. Until this voltage is reached no current flows in this circuit, but for greater voltage values current does flow and with diode 99 poled to give a negative voltage output a negative voltage is impressed upon grid 94 of thyratron 57 for excessive voltage across the autotransformers.

In order to embody a maintenance-free device from practical components it is also highly desirable, if not necessary, to monitor the brush currents of the autotransformers. This is accomplished by sampling the current through one brush of the several parallel-connected autotransformers. The current through the brush (tap) 9b, for example, is passed through resistor 101. This has a low resistance, like one-hundredth ohm. The rated current of ten amperes in the instant case thus gives a tenth of a volt at the primary of step-up transformer 102, the output of which is of the order of eight volts because of a step-up ratio of eighty of the transformer.

As before, a Zener diode 103 and rectifying diode 104 do not allow a negative potential to be built up across capacitor 93 unless the brush current is exceeded, but when this condition occurs, a negative potential sufficient to render thyratron 57 non-conducting is impressed upon grid 94.

When there is no signal flowing in the voice coil circuit my power factor corrector shorts itself out. This is so that at the start of operation functioning of the whole system can be obtained at either high or low frequencies. It will be recalled that it is shorted-out all the time when the frequency is less than 350 cycles, for example.

The shorting upon non-operation of the main portion of the system is accomplished by the lack of negative voltage from the phase-sensitive detector. Without such a negative voltage the thyratrons conduct, the motor 15 goes to the full capacitance position and then operates limit switch 75. The subsequent shorting at relay 85 has been previously explained.

It should now be evident that my power factor corrector is capable of functioning smoothly and automatically to maintain a desirable set of circuit parameters in vibration testing practice and in allied fields. My device operates as an integrated whole to steplessly adjust reactive elements to circuit conditions. This is accomplished without hunting or instability and with overload protection to particular elements of the device which would otherwise pose a serious maintenance problem.

While I have illustrated my invention with continuously variable ratio autotransformers it will be understood that it will function when servo motor 15 actuates a multiple tap switch to change the turns ratio in the same general way that slider 9 operates in FIG. 1. This alternate will not give as smooth operation with changing frequency, or of some other parameter which affects the phase of the voice coil circuit, but is fully operable as a practical matter.

The actuating means may be a solenoid to provide linear motion of a tap along a straight autotransformer rather than the servo motor previously described.

A vacuum diode provided with a fixed blocking bias may be employed instead of the avalanche (Zener) diodes described. Transistors may be used for amplification, as in lieu of double triode 39.

Additional circuits for auxiliary control of an electro-mechanical vibration system or the like may be actuated by employing additional contacts on relays 68, 78 and/or 85.

The ratios of transformers 22, 43, 102, etc. may be changed from those given and proper operation obtained, particularly if the magnitude of the sample taken from the circuit involved is altered to compensate for the ratio change in some degree.

Oil filled capacitors are preferred for the power factor correcting capacitors 7 and 10 (FIG. 1), but others of good quality may also be used. The autotransformers or variable reactors are subject to considerable variation in construction and characteristics and still serve properly in my device.

Still other modifications may be made in the physical characteristics of the elements of my device and in the electrical characteristics of the circuit elements, the details of circuit connections and the alteration of the coactive relation between the elements without departing from the scope of my invention.

Having thus fully described my invention and the manner in which it is to be practiced, I claim:

1. A device to correct power factor comprising a tapped reactor, a capacitor connected between the tap in circuit and one extremity of said reactor, a phase detector, first electrical impedance means connected to said phase detector to provide an electrical input thereto related to the voltage across the circuit in which the power factor correction circuit is included, second electrical impedance means connected to said phase detector to provide an electrical input related to the current through the circuit in which the power factor correction circuit is included, said first and second means connected to said circuit in which the power factor correction circuit is included, means in said second means to produce a phase difference with respect to the phase of said first means, means to vary the tap in circuit on said reactor, a frequency responsive and threshold circuit connected to said means to vary the tap, a discharge tube, and switching means, said discharge tube connected to said phase detector to correct said power factor and said frequency responsive and threshold circuit for the protection of said device through said switching means and said means to vary the tap in circuit on said reactor.

2. A power factor correction circuit comprising an autotransformer having a variable tap, a capacitor connected fully across said autotransformer, a second capacitor connected from said variable tap to one extremity of said autotransformer, a phase detector, first high electrical impedance means connected to said phase detector to provide an electrical input thereto proportional to the voltage across the circuit in which the power factor correction circuit is included, said first means also connected to said circuit, further low electrical impedance means similarly connected to provide an electrical input proportional to the current through said circuit, shift means in said further means to produce approximately phase quadrature with respect to the phase of said first means, means to limit also in said further means serially connected to said shift means to limit the input to said phase detector, a motor to vary the position of the variable tap on said autotransformer, a frequency responsive integrator and an avalanche diode connected to said motor, two gaseous discharge tubes, and two switching means, said tubes connected to said phase detector, and one said tube to said integrator and to said avalanche diode, the outputs of said tubes connected to said two switching means, a zero output from said phase detector causing both of said tubes to actuate said motor to give an extreme value of capacitance to said correction circuit, a small negative output from said phase detector causing the first said tube to stop said motor, and a large negative output from said phase detector causing both tubes to reverse said motor, one extreme position of said motor corresponding to an extreme capacitance value of said power factor correction circuit.

3. An equivalent-variable-capacitor power factor correction circuit for automatic operation comprising an autotransformer having a variable tap, a small capacitor electrically connected fully across said autotransformer, a large capacitor connected from said variable tap to one extremity of said autotransformer, a phase detector, first shunt electrical impedance means connected to said phase detector to provide an electrical input thereto proportional to the voltage across the circuit in which the power factor correction circuit is included, second series electrical impedance means connected to said phase detector to provide an electrical input thereto proportional to the current through the circuit in which the power factor correction circuit is included, said first and said second means also connected to said circuit in which the power factor correction circuit is included, phase shift means in said second means to produce phase quadrature with respect to the phase of said first means, a clipper also in said second means serially connected to said phase shift means to limit the input to said phase detector, a servo motor to vary the position of the variable tap on said autotransformer, a frequency responsive integrator and a Zener diode connected to said servo motor to short out said power factor correction circuit at low audio frequencies, two thyratrons, and two relays, the first of said two thyratrons connected to said phase detector, to said integrator and to said Zener diode, the output of said first thyratron connected to the first of said two relays, both said thyratrons connected to said phase detector, the second thyratron connected to the second relay; a zero output from said phase detector causing both of said thyratrons to conduct and actuate said servo motor to give a maximum equivalent capacitance to said correction circuit, a small negative output from said phase detector causing the first said thyratron to cease conducting and stopping said servo motor, and a large negative output from said phase detector causing both thyratrons to cease conducting and reversing said servo motor, the maximum forward position of said servo motor corresponding to a maximum capacitance value of said power factor correction circuit.

4. Means effective over a range of frequencies to alter the capacitance reactance in a given circuit comprising a fixed capacitor, a variable ratio transformer connected to said capacitor and to said circuit, plural electronic diode means connected to said circuit to sense the phase relation between current and voltage in said circuit, gaseous discharge means connected to said electronic diode means for control thereby, and means to alter the ratio of said transformer in accordance with said phase relation connected to said gaseous discharge means for control thereby.

5. Automatic electro-electronic means to alter the capacitative reactance of a given circuit comprising a fixed capacitor, a variable ratio transformer, said transformer connected between said capacitor and said circuit, dual electronic means separately connected in series and in shunt to said given circuit, to form a voltage proportional to the phase difference between the voltage and the current in said given circuit, and thyratron-actuated electromechanical means controlled by said voltage to alter the ratio of said transformer in proportion to said phase difference.

6. An electronic-sensed power factor device comprising a first capacitor, a reactor having a variable tap, said first capacitor connected across said whole reactor, an electronic phase detector, actuating means, a second capacitor connected to said reactor and to said variable tap thereof, said reactor connected to a circuit the power factor of which is to be altered to constitute an autotransformer between said second capacitor and said circuit, said phase detector connected to said circuit to determine the phase between the current and the voltage in said circuit, said phase detector connected to said actuating means, and said actuating means to said reactor to adjust the tap of said reactor for varying the capacitative reactance of said second capacitor to be reflected into said circuit.

7. A power factor device comprising a capacitor, a reactor having a variable tap, a phase detector, actuating means, said capacitor connected to said reactor, and said reactor to a circuit the power factor of which is to be altered to constitute an autotransformer between said capacitor and said circuit, said phase detector connected to said circuit to determine the phase between the current and the voltage in said circuit, said phase detector also connected to said actuating means, said actuating means connected to said reactor to adjust the tap of said reactor for varying the capacitative reactance reflected into said circuit, and a diode voltage threshold means connected to said reactor and to said actuating means to limit the voltage from said circuit that is impressed across said reactor.

8. A power factor device comprising a capacitor, a reactor having a variable tap, a phase detector, actuating means, said capacitor connected to said reactor, and said reactor to a circuit the power factor of which is to be altered to constitute an autotransformer between said capacitor and said circuit, said phase detector connected to said circuit to determine the phase between the current and the voltage in said circuit, said phase detector also connected to said actuating means, said actuating means connected to said reactor to adjust the tap of said reactor for varying the capacitative reactance reflected into said circuit, and a frequency responsive element having resistive and reactive circuit components connected to said circuit the power factor of which is to be altered and to said actuating means to remove said device from said circuit at low alternating current frequencies.

9. A power factor device comprising a capacitor, a reactor having a variable tap, a phase detector, actuating means, said capacitor connected to said reactor, and said reactor to a circuit the power factor of which is to be altered to constitute an autotransformer between said capacitor and said circuit, said phase detector connected to said circuit to determine the phase between the current and the voltage in said circuit, said phase detector also connected to said actuating means, said actuating means connected to said reactor to adjust the tap of said reactor for varying the capacitative reactance reflected into said circuit, and a resistor and a diode connected to said reactor and to said actuating means to limit the current from said circuit flowing through said reactor to a value within the current-handling capability of the variable tap of said reactor.

10. An automatic power factor correction device comprising a fixed capacitor, a variable ratio transformer, a phase detector, and servo means, said capacitor connected to said transformer and said transformer to the circuit requiring power factor correction, said phase detector connected to said circuit requiring power factor correction to determine the phase between the current and voltage in said circuit, said phase detector connected to said servo means and said servo means mechanically connected to said transformer for adjusting the ratio of said transformer to vary the capacitative reactance reflected into said circuit requiring power factor correction to that value to achieve correction, and a Zener diode and a diode connected to said transformer and to said servo means to limit the voltage from said circuit requiring power factor correction that is impressed across said transformer.

11. An automatic power factor correction device comprising a fixed capacitor, a variable ratio transformer, a phase detector, and servo means, said capacitor connected to said transformer and said transformer to the circuit requiring power factor correction, said phase detector connected to said circuit requiring power factor correction to determine the phase between the current and voltage in said circuit, said phase detector connected to said servo means and said servo means mechanically connected to said transformer for adjusting the ratio of said transformer to vary the capacitative reactance reflected into said circuit requiring power factor correction to that value to achieve correction, and a resistor and a capacitor integrating combination connected to said circuit requiring power factor correction and to said servo means to remove said device from said circuit at low audio frequencies.

12. An automatic power factor correction device comprising a fixed capacitor, a variable ratio transformer, a phase detector, and servo means, said capacitor connected to said transformer and said transformer to the circuit requiring power factor correction, said phase detector connected to said circuit requiring power factor correction to determine the phase between the current and voltage in said circuit, said phase detector connected to said servo means and said servo means mechanically connected to said transformer for adjusting the ratio of said transformer to vary the capacitative reactance reflected into said circuit requiring power factor correction to that value to achieve correction, and a current sensing resistor and a diode connected to said transformer and to said servo means to limit the current from said circuit flowing through said transformer to a value within the current-carrying capability of the variable ratio means of said transformer.

13. An automatic power factor alteration device effective over several octaves of frequency of alternating current comprising a fixed capacitor, a variable ratio transformer, a double-diode bridge phase detector, and a motor, said capacitor connected to said transformer and said transformer to the circuit requiring power factor alteration, said phase detector connected both in shunt and in series to said circuit requiring power factor alteration to electronically determine the phase between the current and the voltage in said circuit as a magnitude of electrical energy, control means, said phase detector connected to said control means and said control means connected to said motor for the actuation and reversal thereof; said motor connected to said transformer to adjust the ratio of said transformer for varying the capacitative reactance transformed into said circuit requiring power factor alteration.

References Cited in the file of this patent

UNITED STATES PATENTS

| | | |
|---|---|---|
| 1,077,626 | Mershon | Nov. 4, 1913 |
| 1,396,826 | Fortescue | Nov. 15, 1921 |
| 2,325,936 | Blume | Aug. 3, 1943 |
| 2,745,067 | True et al. | May 8, 1956 |
| 2,751,551 | Jansen | June 19, 1956 |